United States Patent
Wang et al.

(10) Patent No.: US 9,600,700 B1
(45) Date of Patent: Mar. 21, 2017

(54) PORTABLE ELECTRONIC DEVICE AND OPERATION METHOD THEREOF

(71) Applicant: PIXART IMAGING INC., Hsin-Chu (TW)

(72) Inventors: Guo-Zhen Wang, Hsin-Chu (TW); En-Feng Hsu, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 0 days.

(21) Appl. No.: 15/160,170

(22) Filed: May 20, 2016

Related U.S. Application Data

(63) Continuation-in-part of application No. 15/075,831, filed on Mar. 21, 2016.

(30) Foreign Application Priority Data

Aug. 31, 2015 (TW) .............................. 104128606 A

(51) Int. Cl.
*G06K 7/10* (2006.01)
*G06K 7/14* (2006.01)
*G06K 9/46* (2006.01)
*G06K 9/62* (2006.01)

(52) U.S. Cl.
CPC ....... *G06K 7/1413* (2013.01); *G06K 7/10722* (2013.01); *G06K 7/1417* (2013.01); *G06K 9/4604* (2013.01); *G06K 9/4661* (2013.01); *G06K 9/6215* (2013.01)

(58) Field of Classification Search
CPC ............. G06K 7/1413; G06K 7/10722; G06K 7/1417; G06K 9/4604; G06K 9/4661; G06K 9/6215; G06K 7/10851; G06K 7/10861; G06K 2207/1012
USPC ............................................ 235/435, 462.01
See application file for complete search history.

(56) References Cited

U.S. PATENT DOCUMENTS

| 4,843,222 | A | 6/1989 | Hochgraf |
| 2005/0167498 | A1 | 8/2005 | Ito et al. |
| 2005/0173544 | A1 | 8/2005 | Yoshida |
| 2008/0029603 | A1* | 2/2008 | Harris ................ G06K 7/10851 235/462.31 |

(Continued)

FOREIGN PATENT DOCUMENTS

| CN | 1114441 A | 1/1996 |
| CN | 101615259 A | 12/2009 |

(Continued)

*Primary Examiner* — Laura Gudorf
(74) *Attorney, Agent, or Firm* — Li & Cai Intellectual Property (USA) Office

(57) ABSTRACT

Disclosed are a portable electronic device and an operation method thereof. The portable electronic device comprises a body, a barcode detector and a barcode decoder. In the barcode detector, a first image capturing module continually captures a barcode image when the portable electronic device is operating in the resting mode, a first buffering module temporarily stores the captured barcode image, and a first image processing module processes the stored barcode stored and counts a number of times when the barcode image has a predetermined pattern feature. When the number of times reaches to a threshold number, the barcode decoder is turned on to capture and decode the barcode image, and the barcode detector is switched to operate in a power-saving mode.

10 Claims, 6 Drawing Sheets

(56) References Cited

U.S. PATENT DOCUMENTS

| | | |
|---|---|---|
| 2009/0014520 A1 | 1/2009 | Kofman et al. |
| 2009/0212113 A1* | 8/2009 | Chiu .................... G06K 7/14 |
| | | 235/462.41 |
| 2015/0262051 A1 | 9/2015 | Yoshida |
| 2016/0132707 A1* | 5/2016 | Lindbo .............. G06K 7/10544 |
| | | 235/462.42 |

FOREIGN PATENT DOCUMENTS

| | | |
|---|---|---|
| CN | 202976114 U | 6/2013 |
| TW | 201201107 A1 | 1/2012 |
| TW | 201441945 A | 11/2014 |

* cited by examiner

PORTABLE ELECTRONIC DEVICE AND OPERATION METHOD THEREOF

CROSS-REFERENCE TO RELATED APPLICATIONS

This application is a continuation-in-part of U.S. application Ser. No. 15/075,831, filed on 21 Mar. 2016 and entitled "CODING AND DECODING METHOD USING PATTERNS AND SYSTEM THEREOF", now pending, the entire disclosures of which are incorporated herein by reference.

BACKGROUND OF THE INVENTION

1. Field of the Invention

The instant disclosure relates to a portable electronic device and an operation method thereof; in particular, to a portable electronic device that has an always-on image capturing module to continually detect images and an operation method thereof.

2. Description of Related Art

With the development of mobile technology and electric commerce, barcodes are not only used and seen in shopping malls or super markets, but have become an all-purpose media providing all kinds of information to the public. For example, the two-dimensional barcode, such as the QR code, is commonly seen on walls or boards in public spaces, or even with the appearance on a bus, for users to scan and then to link to a certain website or to obtain a certain social messaging account.

Generally, if the user's portable electronic device is operating in a working mode, the user needs to turn on the master camera and to execute an application for scanning and decoding the barcode. If the user's portable electronic device is operating in a resting mode, the user additionally needs to make his portable electronic device operate in the working mode first; however, it is sometimes not easy when the user is too busy to wake up his portable electronic device manually.

In addition, with respect to the widely used QR code, the first step for detection is to determine its anchor points, which are the three "回"-shaped pattern at three of corners of the barcode image. As known, most of portable electronic devices use their master cameras to detect the anchor points. Refer to FIG. 1. FIG. 1 shows a schematic diagram showing how to determine whether a captured image is a barcode image having a predetermined pattern feature in the prior art. Most traditional barcode detectors of portable electronic devices use the frame buffer to detect the whole image frame of the barcode image. As shown in FIG. 1, in the prior art, the anchor points of the QR code are found by determining whether the detected image has a pattern feature that is an area ratio "3×3:5×5:7×7". However, the detection for the whole image frame of a barcode image needs a complex computation.

SUMMARY OF THE INVENTION

The instant disclosure provides a portable electronic device operating in a resting mode or a working mode. The portable electronic device comprises a body, a barcode detector and a barcode decoder. The barcode detector and the barcode decoder are built in the body. The barcode detector comprises a first image capturing module, a first buffering module and a first image processing module. The first image capturing module is always on when the portable electronic device is operating in the resting mode to continually capture a barcode image. The first buffering module is connected to the first image capturing module, and the first image processing module is connected to the first buffering module. The first buffering module temporarily stores the barcode image captured by the first image capturing module. The first image processing module reads and processes the barcode stored in the first buffering module, and counts a number of times when the barcode image has a predetermined pattern feature. The barcode decoder comprises at least a second image capturing module and a second image processing module, wherein the second image processing module is connected to the second image capturing module. When the first image processing module of the barcode detector determines that the number of times equals to a threshold number, the barcode decoder is automatically turned on, such that the second image capturing module of the barcode decoder captures the barcode image and the second image processing module of the barcode decoder decodes the barcode image.

In one embodiment of the instant disclosure, the barcode image is a two-dimensional barcode image, and the predetermined pattern feature is a predetermined distance ratio. Moreover, the first image processing module comprises an edge detecting module, a binary imaging module, a first operation module, a second operation module and a determination module. The binary imaging module is connected to the edge detecting module, the first operation module is connected to the binary imaging module, the second operation module is connected to the first operation module, and the determination module is connected to the second operation module. After receiving the barcode image, the edge detecting module detects edges of the barcode image and generates a gray-scale barcode image. The binary imaging module receives and processes the gray-scale barcode image to generate a binary barcode image, by converting the gray-scale levels of pixels that are larger than a critical gray-scale level to be a maximum gray-scale level and converting the gray-scale levels of pixels that are smaller than the critical gray-scale level to be a minimum gray-scale level. After receiving the binary barcode image, the first operation module generates a fever chart according to the pixel coordinate and the gray-scale level of a row/column of pixels in the binary barcode image, and calculates distances between the pixels having the maximum gray-scale level. The second operation module calculates a distance ratio according to the distances calculated by the first operation module. The determination module compares the distance ratio calculated by the second operation module with the predetermined distance ratio to generate a comparison result, and counts a number of the comparison results indicating the distance ratio calculated by the first operation module is equal to the predetermined distance ratio. When the determination module determines that the number of the comparison results, indicating the distance ratio calculated by the second operation module is equal to the predetermined distance ratio, equals to the threshold number, the barcode decoder is automatically turned on such that the second image capturing module of the barcode decoder captures the barcode image and the second image processing module of the barcode decoder decodes the barcode image.

The instant disclosure also provides an operation method used in a portable electronic device. The portable electronic device operates in a resting mode and a working mode, and the portable electronic device comprises a body, a barcode detector and a barcode decoder. The barcode detector comprises a first image capturing module, a first buffering module and a first image processing, and the barcode decoder comprises a second image capturing module and a second imaging processing module. The operation method comprises: turning on the barcode detector always when the portable electronic device is operating in the resting mode to continually capture a barcode image by the first image capturing module, and temporarily storing the barcode image in the first buffering module; and reading and processing the barcode image by the first image processing module to count a number of times when the barcode image has a predetermined pattern feature. When the first image processing module of the barcode detector determines that the number of times equals to a threshold number, the barcode decoder is automatically turned on such that the second image capturing module captures the barcode image and the second image processing module decodes the barcode image.

In one embodiment of the instant disclosure, the barcode image is a two-dimensional barcode image, and the predetermined pattern feature is a predetermined distance ratio. Moreover, the step of reading and processing the barcode image by the first image processing module to count the number of times when the barcode image has the predetermined pattern feature further comprises: detecting edges of the barcode image and generating a gray-scale barcode image; processing the gray-scale barcode image to generate a binary barcode image, by converting the gray-scale levels of pixels that are larger than a critical gray-scale level to be a maximum gray-scale level and converting the gray-scale levels of pixels that are smaller than the critical gray-scale level to be a minimum gray-scale level; generating a fever chart according to the pixel coordinate and the gray-scale level of a row/column of pixels in the binary barcode image, and calculating distances between the pixels having the maximum gray-scale level; calculating a distance ratio according to the distances calculated by the first operation module; and comparing the distance ratio calculated by the second operation module with the predetermined distance ratio to generate a comparison result, and counting a number of the comparison results indicating the distance ratio calculated by the first operation module is equal to the predetermined distance ratio. When the determination module determines that the number of the comparison results, indicating the distance ratio calculated by the second operation module is equal to the predetermined distance ratio, equals to the threshold number, the barcode decoder is automatically turned on, such that the second image capturing module of the barcode decoder captures the barcode image and the second image processing module of the barcode decoder decodes the barcode image.

To sum up, in the portable electronic device and the operation method thereof provided by the instant disclosure, the barcode detector is always turned on to continually capture an image and determines whether the captured image is a barcode image having a predetermined pattern feature. Further, the barcode decoder can be automatically turned on to capture and decode the barcode image having the predetermined pattern feature. Moreover, in the instant disclosure, the predetermined pattern feature is a predetermined distance ratio and thus there is only a one-line buffer is needed to store pixel data row by row or column by column. In other words, the portable electronic device provided by the instant disclosure does not use the frame buffer to process the captured images like the traditional barcode detector, which is much more hardware friendly and decreases the computational complexity for detecting and determining whether the captured image is a barcode image having a predetermined pattern feature.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, and/or sections, these elements, components, regions, and/or sections should not be limited by these terms. These terms are only to distinguish one element, component, region, and/or section from another element, component, region, and/or section. Thus a first element, component, region and/or section discussed below could be termed a second element, component, region or section without departing from the teachings of the instant disclosure. As used herein, the term "and/or" includes any and all combinations of one or more of the associated listed items.

[One Embodiment of a Portable Electronic Device]

Figure 1:
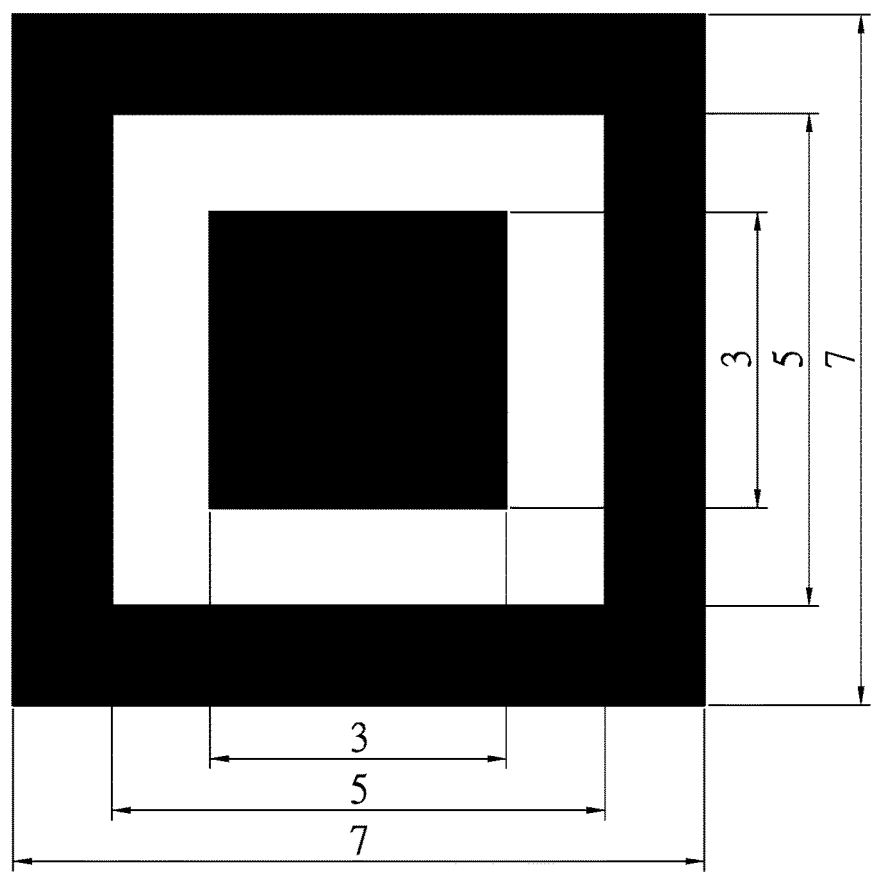
FIG. 1 shows a schematic diagram showing how to determine whether a captured image is a barcode image having a predetermined pattern feature in the prior art.
Figure 2:
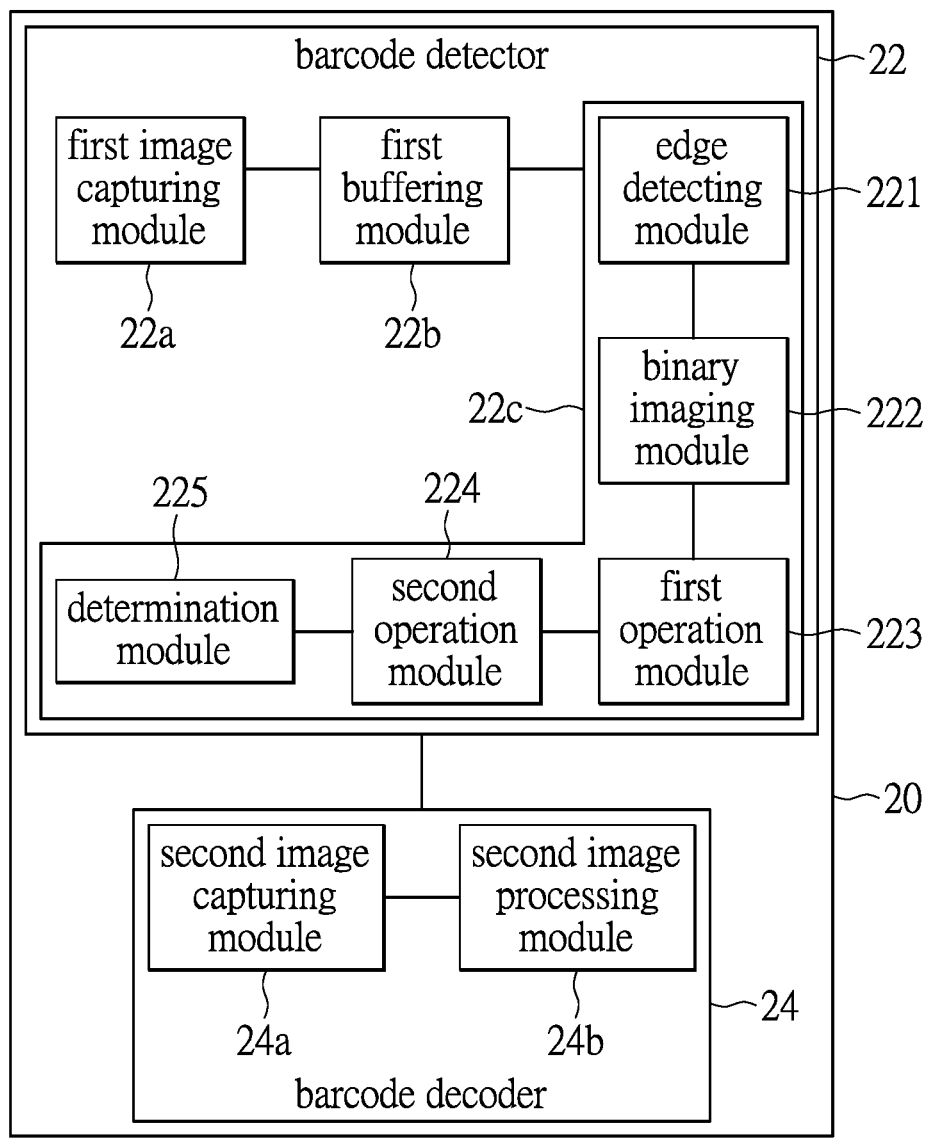
FIG. 2 shows a block diagram of a portable electronic device of one embodiment of the instant disclosure.

Referring to FIG. 2, FIG. 2 shows a block diagram of a portable electronic device of one embodiment of the instant disclosure. In this embodiment, the portable electronic device 2 is operating in a resting mode or a working mode. The portable electronic device 2 in this embodiment can be, for example, a smart phone, a tablet or the like, and it is not limited herein.

As shown in FIG. 2, the portable electronic device 2 comprises a body 20, a barcode detector 22 and a barcode decoder 24. The barcode detector 22 and the barcode decoder 24 are built in the body 20. The barcode detector 22 comprises at least a first image capturing module 22*a*, a first buffering module 22*b* and an image processing module 22*c*. The first buffering module 22*b* is connected to the first image capturing module 22a, and the image processing module 22c is connected to the first buffering module 22b. The barcode decoder 24 comprises at least a second image capturing module 24a and a second image processing module 24b. The second image processing module 24b is connected to the second image capturing module 24a.

When the master camera of portable electronic device 2 is operating in the working mode, the barcode detector 22 operates in a power-saving mode, but when the master camera of portable electronic device 2 is operating in the resting mode, the barcode detector 22 is always turned on, such that the first image capturing module 22a can continually capture an image. The captured image is temporarily stored in the first buffering module 22b. After reading the image stored in the first buffering module 22b, the first image processing module 22c processes the image to count a number of times when the image has a predetermined pattern feature. When the number of times equals to a threshold number, the first image processing module 22c determines that the image is a barcode image and thus the barcode decoder 24 is automatically turned on, such that the second image capturing module 24a of the barcode decoder 24 can capture the barcode image and the second image processing module 24b of the barcode decoder 24 can decode the barcode image. In other words, when the portable electronic device 2 is operating in the resting mode, the barcode detector 22 is always turned on to detect images, but at the same time the barcode decoder 24 is shut down. Until the barcode detector 22 counts the number of times when the detected image has a predetermined pattern feature and determines that the number of times equals to the threshold number, the barcode detector 22 determines that the detected image is a barcode image, and thus the barcode decoder 24 is automatically turned on to capture and decode the barcode image.

It is worth mentioning that, once the barcode decoder 24 is automatically turned on to capture and decode the barcode image, the portable electronic device 2 will operate in the working mode and thus the barcode detector 22 operates in the power-saving mode.

Figure 4:
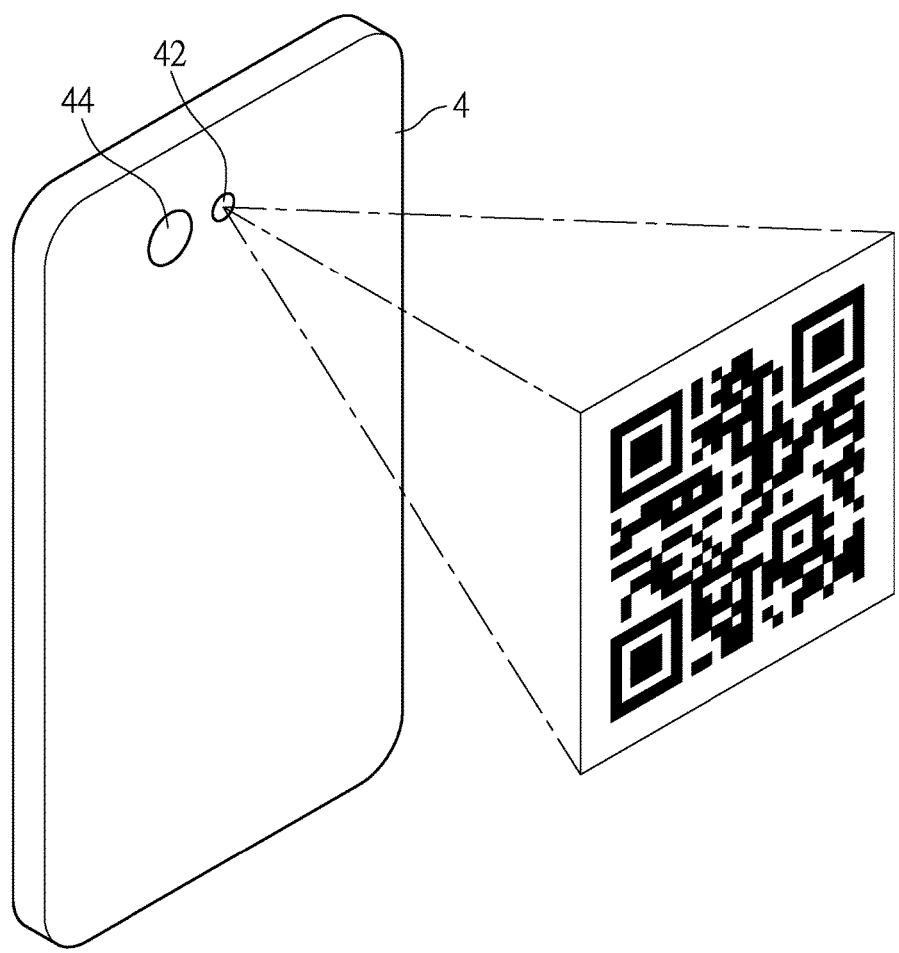
FIG. 4 shows a schematic diagram of a portable electronic device when capturing images of one embodiment of the instant disclosure.

Refer to FIG. 4. FIG. 4 shows a schematic diagram of a portable electronic device when capturing images of one embodiment of the instant disclosure. For example, the portable electronic device 2 is a smart phone 4 as shown in FIG. 4. In this embodiment, the first image capturing module 22a of the barcode detector 22 is a low-level image sensor used as an auxiliary camera 42 of the smart phone 4, wherein the low-level image sensor has a low power consumption and an always-on function such that the smart phone 4 can continually capture images even when working in the resting mode. Comparing with the first image capturing module 22a of the barcode detector 22, the second image capturing module 24a of the barcode decoder 24 is a high-level image sensor used as a master camera 44 of the smart phone 4, which has a high resolution to capture a barcode image for the further decoding. Moreover, the second image processing module 24b of the barcode decoder 24 is a programmable application correspondingly installed in the smart phone 4 to decode the barcode image captured by the master camera 44 of the smart phone 4.

From the above, even when the smart phone 4 is operating in the resting mode, the auxiliary camera 42 is always turned on to continually capture images. When the image captured by the auxiliary camera 42 is determined to be a barcode image having enough predetermined pattern features, the smart phone 4 will be automatically woken up to operate in the working mode, such that the master camera 44 will be turned on for capturing the barcode image and the programmable application installed in the smart phone 4 will be executed for decoding the captured barcode image.

Thereby, the portable electronic device 2 in this embodiment can directly capture and determine whether an image is a barcode image having a predetermined pattern feature without a need to be woken up to operate in the working mode by a user, which provides an extraordinary convenience.

The following description illustrates how the barcode detector 22 in this embodiment determines whether a captured image is a barcode image having a predetermined pattern feature. In conjunction with FIG. 2, FIGS. 3A-3E shows a set of schematic diagrams showing how to determine if a captured image is a barcode image having a predetermined pattern feature in the embodiments provided by the instant disclosure.

As shown in FIG. 2, the first image processing module 22c of the portable electronic device 2 further comprises an edge detecting module 221, a binary imaging module 222, a first operation module 223, a second operation module 224 and a determination module 225. The binary imaging module 222 is connected to the edge detecting module 221, the first operation module 223 is connected to the binary imaging module 222, the second operation module 224 is connected to the first operation module 223, and the determination module 225 is connected to the second operation module 224.

Figure 3A:
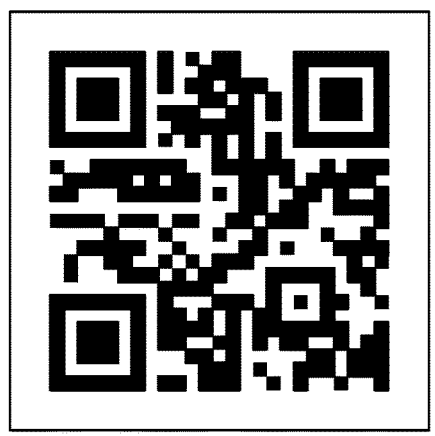
FIGS. 3A-3E shows a set of schematic diagrams showing how to determine whether a captured image is a barcode image having a predetermined pattern feature in the embodiments provided by the instant disclosure.

As described above, when the portable electronic device 2 is operating in the resting mode, the barcode detector 22 is always turned on for continually capturing images. To be specific, in this embodiment, the barcode image is a two-dimensional barcode image, wherein the predetermined pattern feature of the two-dimensional barcode image is a predetermined distance ratio, but the type of the barcode image is not restricted herein. From the above, in this embodiment, the barcode image detected by the barcode detector 22 can be a two-dimensional barcode image as shown in FIG. 3A, which is a QR code.

In detail, the pixel data of the two-dimensional barcode image captured by the first image capturing module 22a is temporarily stored in the first buffering module 22b row by row or column by column. The first image processing module 22c reads and processes rows/columns of pixel data stored in the first buffering module 22b sequentially. It is worth mentioning that, in this embodiment, the first buffering module 22b comprises at least a line buffer, but it is not limited herein.

Figure 3B:
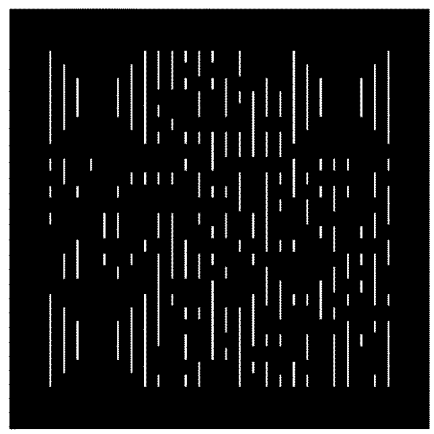

At the beginning of the process, once receiving a row/column of pixel data, the edge detecting module 221 sequentially detects the edges of pixels of the barcode image, and accordingly generates a gray-scale barcode image as shown in FIG. 3B. Receiving the pixel data of the gray-scale barcode image row by row or column by column, the binary imaging module 222 sequentially processes a row/column of pixel data to remove signal interferences. Specifically speaking, the binary imaging module 222 converts the gray-scale levels of pixels that are larger than a critical gray-scale level to be a maximum gray-scale level, and converts the gray-scale levels of pixels that are smaller than the critical gray-scale level to be a minimum gray-scale level. According to the converted gray-scale levels of pixels, the binary imaging module 222 generates a binary barcode image.

It should be noted that, the working principles of the above described edge-detecting process and binary-imaging process should be easily understood by the skilled in the art, and thus the relevant details will not be further described.

Figure 3C:
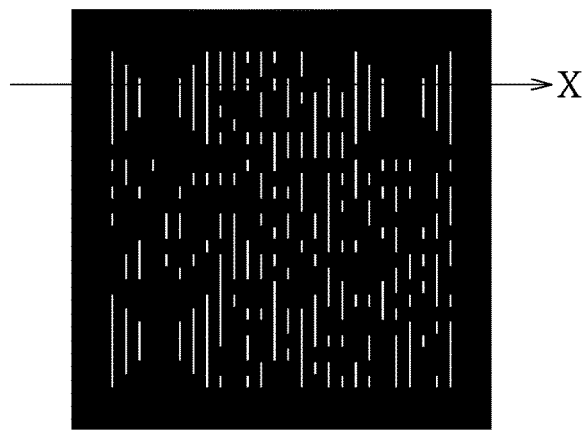

After receiving the binary barcode image as shown in FIG. 3C, the first operation module 223 generates a fever chart according to the pixel coordinate and the gray-scale level of a row/column of pixels in the binary barcode image. For example, as shown in FIG. 3C, the pixel coordinates of a row/column of pixels along the X direction are sequentially defined as 1, 2, . . . , 15 . . . , and the gray-scale level of the row/column of pixels are converted to be either the maximum gray-scale level "1" or the minimum gray-scale level "0". In this case, the first operation module 223 can generate a fever chart as shown in FIG. 3D, wherein the horizontal axis represents the pixel coordinate of pixels and the vertical axis represents the gray-scale level of pixels.

Figure 3D:
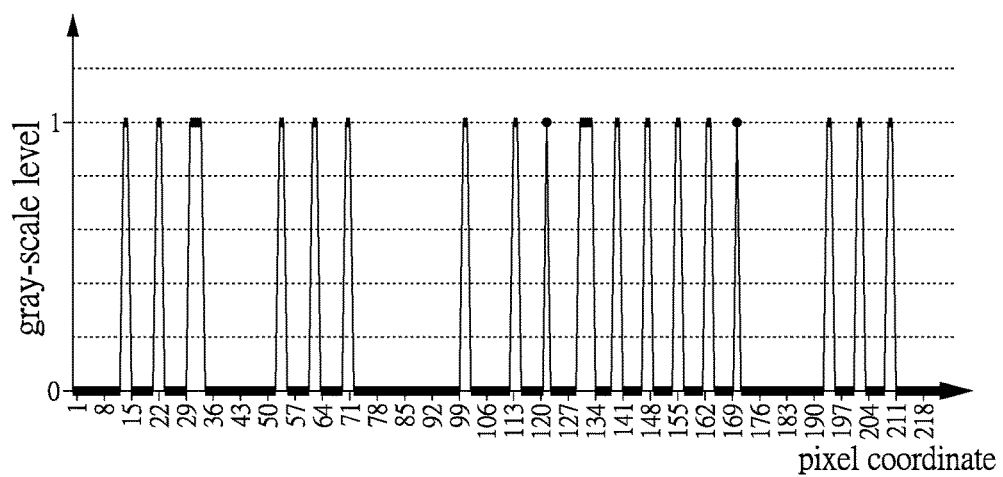

As shown in FIG. 3D, the pixel coordinate of the first pixel having the maximum gray-scale level "1" along the X direction shown in FIG. 3D is 15, the pixel coordinate of the second pixel having the maximum gray-scale level "1" along the X direction shown in FIG. 3D is 22, the pixel coordinate of the third pixel having the maximum gray-scale level "1" along the X direction shown in FIG. 3D is 29~35, the pixel coordinate of the fourth pixel having the maximum gray-scale level "1" along the X direction shown in FIG. 3D is 53, the pixel coordinate of the fifth pixel having the maximum gray-scale level "1" along the X direction shown in FIG. 3D is 60, and the pixel coordinate of the sixth pixel having the maximum gray-scale level "1" along the X direction shown in FIG. 3D is 67. On the other hand, the pixels at the pixel coordinates 1~14, 16~21, 23~28, 35~52, 54~59 and 61~66 have the minimum gray-scale level "0".

Thereby, based on the fever chart shown in FIG. 3D, the first operation module 23 calculates distances between the pixels having the maximum gray-scale level "1". Herein, the unit of distance refers to the number of pixels. In other words, the distance between two pixels having the maximum gray-scale level "1" refers to the number of pixels having the minimum gray-scale level "0" between these two pixels having the maximum gray-scale level "1". Thus, according to the fever chart shown in FIG. 3D, it is calculated by the first operation module 23 that, the distance between the first and the second pixels having the maximum gray-scale level "1" along the X direction shown in FIG. 3C is 7. In other words, there are 7 pixels having the minimum gray-scale level "0" between the first and the second pixels having the maximum gray-scale level "1" along the X direction shown in FIG. 3C. Similarly, the distance between the second and the third pixels having the maximum gray-scale level "1" along the X direction shown in FIG. 3C is 7, the distance between the third and the fourth pixels having the maximum gray-scale level "1" along the X direction shown in FIG. 3C is 21, the distance between the fourth and the fifth pixels having the maximum gray-scale level "1" along the X direction shown in FIG. 3C is 7, and the distance between the fifth and the sixth pixels having the maximum gray-scale level "1" along the X direction shown in FIG. 3C is 7.

According to these calculated distances between the pixels having the maximum gray-scale level "1", the second operation module 224 calculates a distance ratio. Finally, the determination module 225 compares the distance ratio calculated by the first operation module 224 with a predetermined distance ratio that is the predetermined pattern feature of the two-dimensional barcode image, and generates a comparison result. Further, according to the comparison result, the determination module 225 counts a number of the comparison results indicating the distance ratio calculated by the first operation module 224 is equal to the predetermined distance ratio. It is worth mentioning that, different types of barcode images have various pattern features. With respect to the two-dimensional barcode image in this embodiment, the pattern feature is a predetermined distance ratio which is "1:1:3:1:1", but the type of the barcode image is not limited herein.

When the number of the comparison results, indicating the distance ratio calculated by the first operation module 224 is equal to the predetermined distance ratio, equals to the threshold number, the barcode decoder 24 is automatically turned on, such that the second image capturing module 24a of the barcode decoder 24 captures the barcode image and the second image processing module 24b of the barcode decoder 24 decodes the barcode image. It is worth mentioning that, in this embodiment, the threshold number is set as "1", but it can also be any positive integer more than "1" which is not limited herein.

According to the above calculated distances between the pixels having the maximum gray-scale level "1", which are respectively "7, 7, 21, 7, and 7", the second operation module 224 calculates a distance ratio which is "1:1:3:1:1". Finally, the determination module 225 compares the distance ratio calculated by the second operation module 224 and the predetermined distance ratio, and determines that they are equal because both of them are "1:1:3:1:1". Thus, the determination module 225 generates a comparison result indicating the distance ratio obtained by the second operation module 224 is equal to the predetermined distance ratio. In addition, the determination module 225 counts that there is currently one comparison result indicating the distance ratio obtained by the second operation module 224 is equal to the predetermined distance ratio.

So far, "1" (the number of the comparison results indicating the distance ratio calculated by the first operation module 224) is equal to "1" (the threshold number). The barcode decoder 24 is thus automatically turned on, such that the second image capturing module 24a of the barcode decoder 24 captures the barcode image and the second image processing module 24b of the barcode decoder 24 decodes the barcode image.

In addition to detecting images in the resting mode and automatically decoding the barcode images in the working mode, the portable electronic device 2 in this embodiment only needs a one-line buffer to temporarily store the pixel data row by row or column by column. In other words, the barcode detector 22 of the portable electronic device 2 does not use the frame buffer to process the whole frame image of the captured images like a traditional barcode detector, and so is much more hardware friendly and decreases the computational complexity for detecting and determining whether the captured image is a barcode image having a predetermined pattern feature.

Figure 3E:
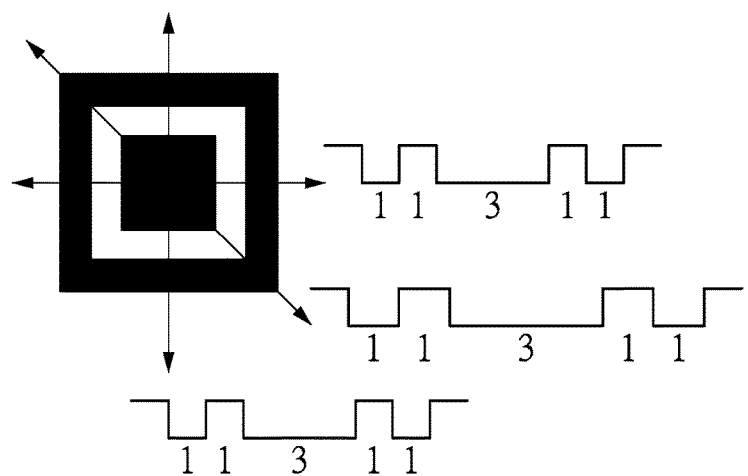

Moreover, refer to FIG. 3E. As described, in this embodiment, the pattern feature of the two-dimensional barcode is a predetermined distance ratio, which is "1:1:3:1:1". Thus, as shown in FIG. 3E, if the detected image is actually a two-dimensional barcode image, the barcode detector 22 can always determine that the detected image has the predetermined pattern feature of the two-dimensional barcode image no matter along which direction the barcode detector 22 detects the image, and the barcode decoder 24 can be immediately turned on for decoding.

[One Embodiment of an Operation Method]

Figure 5:
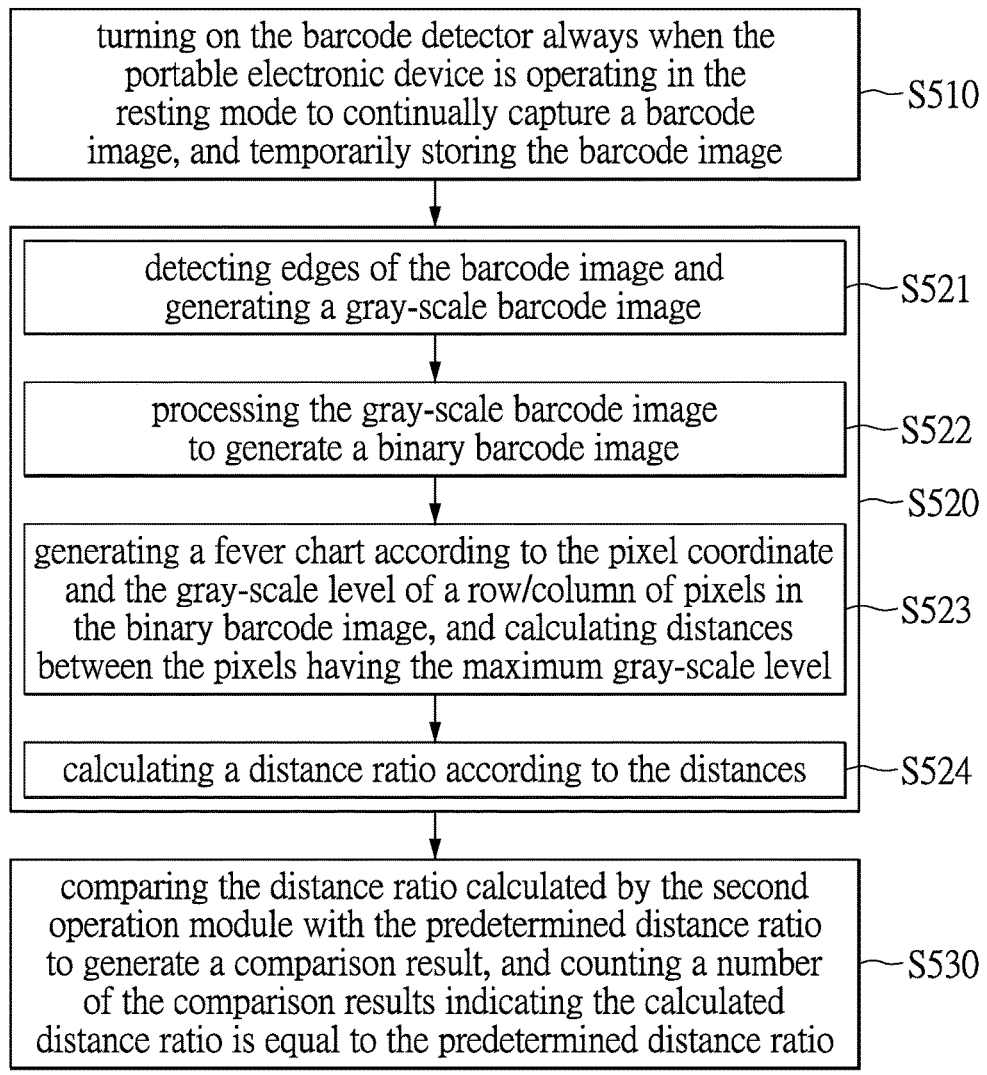
FIG. 5 shows a flow chart of an operation method used in a portable electronic device of one embodiment of the instant disclosure.

Refer to FIG. 5. FIG. 5 shows a flow chart of an operation method used in a portable electronic device of one embodiment of the instant disclosure.

The operation method in this embodiment is used in the portable electronic device 2 described in the last embodiment. Again refer to FIG. 2. The portable electronic device 2 comprises a body 20, a barcode detector 22 and a barcode decoder 24. The barcode detector 22 comprises a first image capturing module 22a, a first buffering module 22b and a first image processing module 22c, wherein the first buffering module 22b is connected to the first image capturing module 22a and the first image processing module 22c is connected to the first buffering module 22b. The barcode decoder 24 comprises a second image capturing module 24a and a second imaging processing module 24b, wherein the second imaging processing module 24b is connected to the second image capturing module 24a. Based on the above described configuration of the portable electronic device 2, the operation method in this embodiment comprises the following steps, as shown in FIG. 5.

The step S510 is to always turn on the barcode detector when the portable electronic device is operating in the resting mode for continually capturing an image by the first image capturing module, and to temporarily store the captured image in the first buffering module. After that, the step S520 is to read and process the image by the first image processing module to count a number of times when the barcode image has a predetermined pattern feature. Finally, in the step S530, when the number of times equals to a threshold number, it is determined that the detected image is a barcode image having enough pattern features, and thus the barcode decoder is automatically turned on, such that the second image capturing module captures the barcode image and the second image processing module decodes the barcode image.

Specifically speaking, the step S520 further comprises the following steps. The step S521 is to detect edges of the barcode image and to generate a gray-scale barcode image. The step S522 is to process the gray-scale barcode image to generate a binary barcode image, by converting the gray-scale levels of pixels that are larger than a critical gray-scale level to be a maximum gray-scale level and converting the gray-scale levels of pixels that are smaller than the critical gray-scale level to be a minimum gray-scale level. After that, the step S523 is to generate a fever chart according to the pixel coordinate and the gray-scale level of a row/column of pixels in the binary barcode image, and to calculate distances between the pixels having the maximum gray-scale level.

The step S524 is to calculate a distance ratio according to the distances calculated by the first operation module. After that, the step S530 is to compare the distance ratio calculated by the second operation module with the predetermined distance ratio and generate a comparison result, and to count a number of the comparison results indicating the distance ratio calculated by the second operation module is equal to the predetermined distance ratio. Finally, when the number of the comparison results, indicating the distance ratio calculated by the first operation module is equal to the predetermined distance ratio, equals to the threshold number, it goes to the step S530 is to automatically turn on the barcode decoder, such that the second image capturing module of the barcode decoder captures the barcode image and the second image processing module of the barcode decoder decodes the barcode image.

Relevant details of the steps of the operation method used in the portable electronic device 2 are described in the embodiments shown in FIG. 2 FIGS. 3A-3E and FIG. 4, and thus it is not repeated. It is clarified that, a sequence of steps in FIG. 5 is set for a need to instruct easily, and thus the sequence of the steps is not used as a condition in demonstrating the embodiments of the instant disclosure.

To sum up, in the portable electronic device and the operation method thereof provided by the instant disclosure, the barcode detector is always turned on to continually capture an image and determine whether the captured image is a barcode image having a predetermined pattern feature. Further, the barcode decoder can be automatically turned on to capture and decode the barcode image having the predetermined pattern feature. Moreover, in the instant disclosure, the predetermined pattern feature is a predetermined distance ratio and thus only a one-line buffer is needed to store pixel data row by row or column by column. In other words, the portable electronic device provided by the instant disclosure does not use the frame buffer to process the whole frame images of the captured images like the traditional barcode detector, which is much more hardware friendly and decreases the computational complexity for detecting and determining whether the captured image is a barcode image having a predetermined pattern feature.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A portable electronic device, operating in a resting mode or a working mode, the portable electronic device comprising:
   a body;
   a barcode detector, built in the body, comprising:
      a first image capturing module, always-on to continually capture a barcode image when the portable electronic device is operating in the resting mode;
      a first buffering module, connected to the first image capturing module, temporarily storing the barcode image captured by the first image capturing module; and
      a first image processing module, connected to the first buffering module, reading and processing the barcode stored in the first buffering module, and counting a number of times when the barcode image has a predetermined pattern feature; and
   a barcode decoder, built in the body and connected to the barcode detector, comprising at least a second image capturing module and a second image processing module, wherein the second image processing module is connected to the second image capturing module;
   wherein when the first image processing module of the barcode detector determines that the number of times equals to a threshold number, the barcode decoder is automatically turned on, such that the second image capturing module of the barcode decoder captures the barcode image and the second image processing module of the barcode decoder decodes the barcode image.

2. The portable electronic device according to claim 1,
   wherein when the portable electronic device is operating in the working mode, the barcode detector operates in a power-saving mode; and
   wherein when the portable electronic device is operating in the resting mode, the barcode decoder is shut down.

3. The portable electronic device according to claim 1, wherein the barcode image is a two-dimensional barcode image and the predetermined pattern feature is a predetermined distance ratio.

4. The portable electronic device according to claim 1, wherein the first buffering module comprises at least a line buffer.

5. The portable electronic device according to claim 3, wherein the first image processing module comprises:
- an edge detecting module, receiving the barcode image, detecting edges of the barcode image and generating a gray-scale barcode image;
- a binary imaging module, connected to the edge detecting module, receiving and processing the gray-scale barcode image to generate a binary barcode image, by converting the gray-scale levels of pixels that are larger than a critical gray-scale level to be a maximum gray-scale level and defining the gray-scale levels of pixels that are smaller than the critical gray-scale level to be a minimum gray-scale level;
- a first operation module, connected to the binary imaging module, receiving the binary barcode image, generating a fever chart according to the pixel coordinate and the gray-scale level of a row/column of pixels in the binary barcode image, and calculating distances between the pixels having the maximum gray-scale level;
- a second operation module, connected to the first operation module, calculating a distance ratio according to the distances calculated by the first operation module; and
- a determination module, connected to the second operation module, comparing the distance ratio calculated by the second operation module with the predetermined distance ratio to generate a comparison result, and counting a number of the comparison results indicating the distance ratio calculated by the second operation module is equal to the predetermined distance ratio;
- wherein when the determination module determines that the number of the comparison results, indicating the distance ratio calculated by the second operation module is equal to the predetermined distance ratio, equals to the threshold number, the barcode decoder is automatically turned on, such that the second image capturing module of the barcode decoder captures the barcode image and the second image processing module of the barcode decoder decodes the barcode image.

6. An operation method, used in a portable electronic device, wherein the portable electronic device operating in a resting mode and a working mode, and the portable electronic device comprising a body, a barcode detector and a barcode decoder, the barcode detector comprises a first image capturing module, a first buffering module and a first image processing module, and the barcode decoder comprises a second image capturing module and a second imaging processing module, the operation method comprising:
- turning on the barcode detector always when the portable electronic device is operating in the resting mode to continually capture a barcode image by the first image capturing module, and temporarily storing the barcode image in the first buffering module; and
- reading and processing the barcode image by the first image processing module to count a number of times when the barcode image has a predetermined pattern feature;
- wherein when the first image processing module of the barcode detector determines that the number of times equals to a threshold number, the barcode decoder is automatically turned on such that the second image capturing module captures the barcode image and the second image processing module decodes the barcode image.

7. The operation method according to claim 6,
- wherein when the portable electronic device is operating in the working mode, the barcode detector operates in a power-saving mode; and
- wherein when the portable electronic device is operating in the resting mode, the barcode decoder is shut down.

8. The operation method according to claim 6, wherein the barcode image is a two-dimensional barcode image and the predetermined pattern feature is a predetermined distance ratio.

9. The operation method according to claim 6, wherein the first buffering module comprises at least a line buffer.

10. The operation method according to claim 8, wherein the step of reading and processing the barcode image by the first image processing module to count the number of times when the barcode image has the predetermined pattern feature further comprises:
- detecting edges of the barcode image and generating a gray-scale barcode image;
- processing the gray-scale barcode image to generate a binary barcode image by converting the gray-scale levels of pixels that are larger than a critical gray-scale level to be a maximum gray-scale level and converting the gray-scale levels of pixels that are smaller than the critical gray-scale level to be a minimum gray-scale level;
- generating a fever chart according to the pixel coordinate and the gray-scale level of a row/column of pixels in the binary barcode image, and calculating distances between the pixels having the maximum gray-scale level;
- calculating a distance ratio according to the distances calculated by the first operation module; and
- comparing the distance ratio calculated by the second operation module with the predetermined distance ratio to generate a comparison result, and counting a number of the comparison results indicating the distance ratio calculated by the first operation module is equal to the predetermined distance ratio;
- wherein when the determination module determines that the number of the comparison results, indicating the distance ratio calculated by the second operation module is equal to the predetermined distance ratio, equals to the threshold number, the barcode decoder is automatically turned on, such that the second image capturing module of the barcode decoder captures the barcode image and the second image processing module of the barcode decoder decodes the barcode image.

* * * * *